United States Patent [19]

Annas et al.

[11] 4,023,446
[45] May 17, 1977

[54] BAND SAW GRINDER

[76] Inventors: Dulin L. Annas, Rte. 7, Indian Hills, Hickory, N.C. 28601; Richard M. Teague, Rte. 1, Box 180, Taylorsville, N.C. 28681

[22] Filed: July 14, 1975

[21] Appl. No.: 595,810

[52] U.S. Cl. .................................... 76/40; 76/77
[51] Int. Cl.² .................................... B23D 63/12
[58] Field of Search ............... 76/25 A, 37, 40, 41, 76/74, 77, 78 R, 78 A, 112; 51/33 R

[56] References Cited

UNITED STATES PATENTS

| 316,568 | 4/1885 | Prat | 76/41 X |
|---|---|---|---|
| 435,121 | 8/1890 | Pierson | 76/40 |
| 620,255 | 2/1899 | Schofield | 76/78 A X |
| 654,845 | 7/1900 | Schofield | 76/74 |
| 667,924 | 2/1901 | Schofield | 76/41 |
| 1,217,095 | 2/1917 | Krump | 76/112 |
| 1,491,706 | 4/1924 | Klin | 76/78 R |
| 3,592,085 | 7/1971 | Arneson | 76/25 A |

*Primary Examiner*—Al Lawrence Smith
*Assistant Examiner*—Nicholas P. Godici
*Attorney, Agent, or Firm*—James E. Britt

[57] ABSTRACT

According to this invention, two band saw grinder units are constructed in paired relationship, spaced apart, and arranged to receive two band saw bands suspended from overhead supports which will permit the bands to move up and down for the grinding operation instead of horizontal as in the prior art. The grinder units are controlled and powered from a central mechanism located in the area between the units, while the bands are supported in an area outward from the area occupied by the central control mechanism, avoiding conflicting occupancy of the various parts. Novel construction and improved means for adjusting the linkage required for accurate grinding of one or two blades at a time are outstanding features of the invention.

10 Claims, 9 Drawing Figures

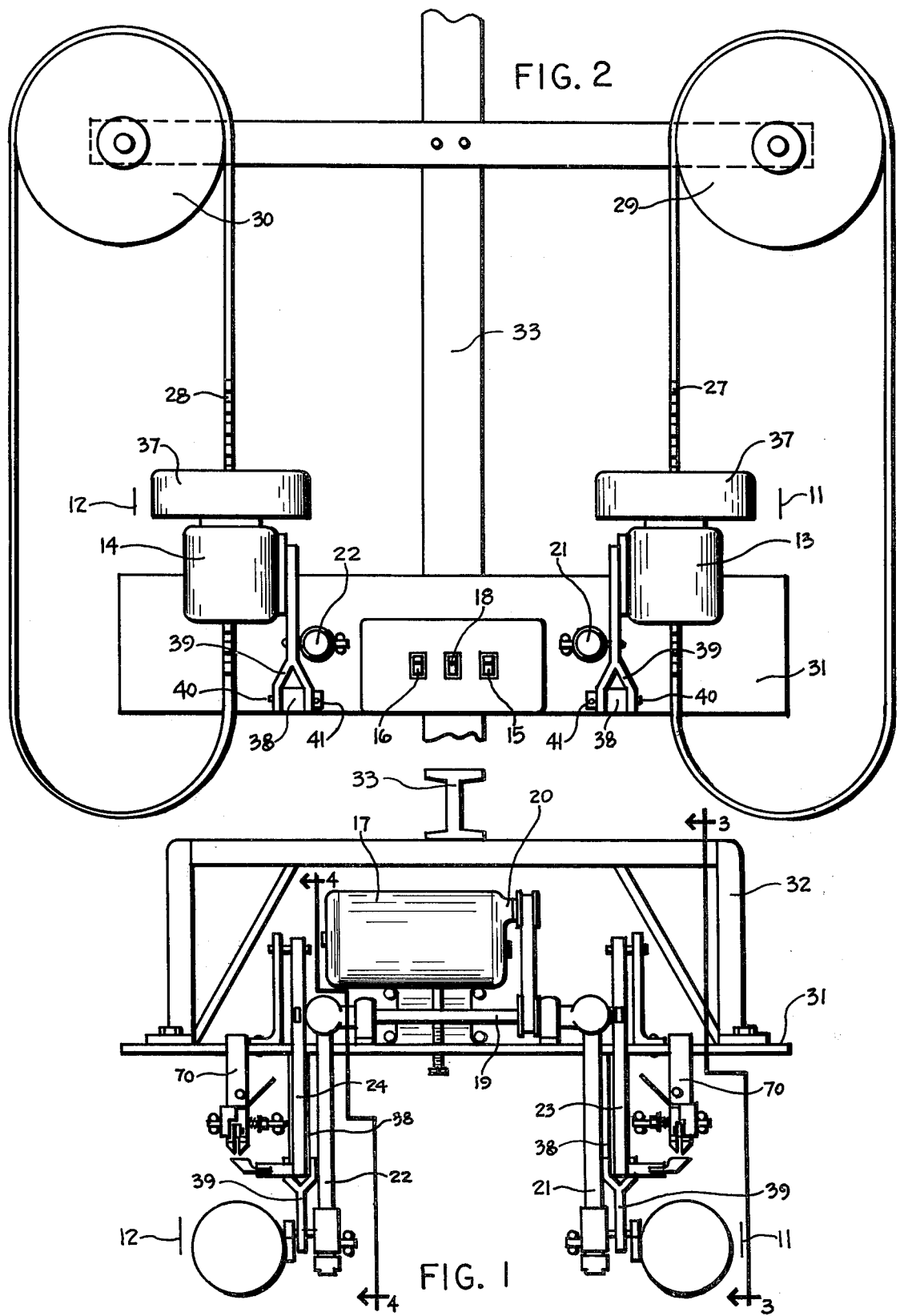

BAND SAW GRINDER

This invention is for improvements in band saw grinders. It is an object of this invention to devise a band saw grinder that is simple in design and accurate in operation.

Another object is to arrange the parts for easy access for service and clear view in making a set up for putting a saw blade in for the sharpening operation.

A further object is to employ exact design of parts by reason of which minimum adjustment will have to be made to begin operation. Likewise, by reason of exact design inconsequential and little, if any, compensating adjustment will be required due to wear.

A still further object is to provide easy and accurate control of a highspeed saw grinding wheel as it contacts a tooth of a band saw blade to accomplish the optimum amount of grinding for the best cutting operation of the saw and at the same time permit the maximum number of resharpenings during the life of the saw.

Another object is to construct a saw grinder which provides for the blades to be suspended from overhead supports so that the blade is extended vertically instead of horizontally and the grinding heads arranged in a position so that the saws can be readily seen while the grinding operation is in progress.

Still another object is to construct the grinder units in pairs so that two saws can be loaded for grinding at the same time.

Another object is to provide for paired construction of the grinder units to permit the location of the control mechanism in the area between the grinder units contributing to a compact structure, avoiding conflicting occupancy of space by the various parts.

These and other objects will be apparent from the detail specification and claims and accompanying drawings, in which:

FIG. 1 is a plan view looking down from above;

FIG. 2 is an elevation showing saw blades suspended from idle wheels;

Figure 3:
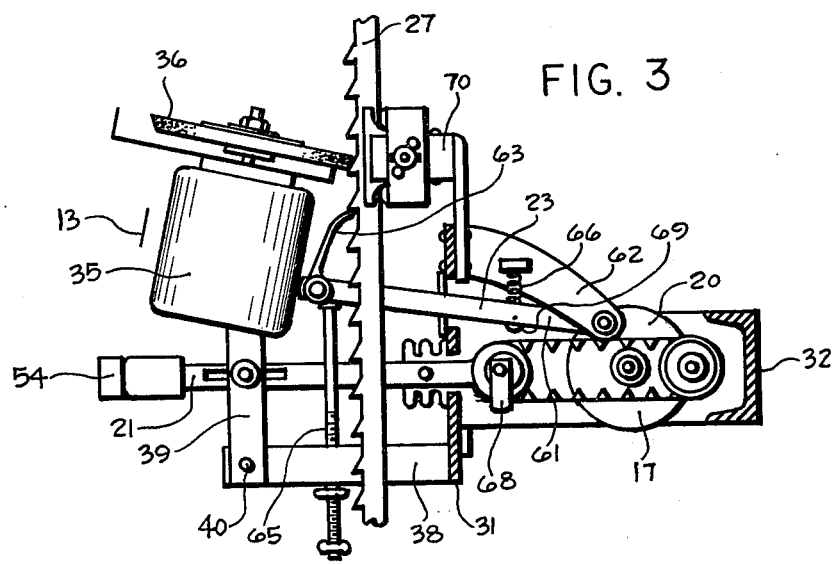
FIG. 3 is a section view looking as indicated along line 3—3 in FIG. 1.

The design principles set forth above are as follows:

The parts, joints and fittings of the grinder now to be described are to be made accurately with close tolerances and accurate fits which have been found to provide a machine which can be adjusted to close limits and which will maintain such adjustment for considerable periods of operation. Another advantage of such method of construction is that it will undergo little of the type of wear that would affect accuracy of operation. It is to be understood that this criteria of construction is to apply to all of the details described in this specification.

While the description and drawings relate to a specific embodiment of this invention it is not intended to so restrict the application thereof to band saw grinders.

According to this invention the machine is made with a pair of grinder units constructed in opposed complementary relationship form and driven from a common mechanism.

The grinder units are shown generally at 11 in the right areas of FIGS. 1 and 2 and at 12 in the left areas of FIGS. 1 and 2. Each grinder is equipped with the same type motor in housing 13 on the right and 14 on the left. The motors therein are controlled by separate electric switches, 15 for the motor in housing 13 and 16 for the motor in housing 14.

A feed motor 17 controlled by switch 18 operates a common shaft 19 through a speed reducing drive 20 of a type well known in the art. Opposite ends of the shaft are equipped, as will be more fully explained, with similar eccentrally operated link assemblies 21 and 22 to control the grinding movements of the grinder units 11 and 12 and pusher levers assemblies 23 and 24 to move the saws tooth by tooth, to be explained.

When the grinders are in operation, separate saw blades 27 and 28 are mounted for grinding, each by one of the grinder units.

The saw blades are draped over idle wheels 29 and 30 and move vertically up one side and down the other as they are advanced during the grinding operation. This requires much less floor space than when blades are disposed horizontally.

The grinder units will now be described in detail. The grinders are constructed alike except they are paired in opposite configuration and details described apply to both keeping in mind such relationships.

The grinder units and their co-functioning parts are carried in a frame work shown best in FIG. 1. The framework includes a front main plate 31 with supporting frame 32. The whole machine may be mouunted to a column 33 by suitable fastening means. The machine may be placed on a table or bench by providing suitable legs or other supporting framework. An enclosing hood or box cabinet, not shown, may be added to protect moving parts from dust and grit resulting from the grinding operation. Suitable boots for the same purpose may be added where the links and bars pass through the front plate 31.

Figure 4:
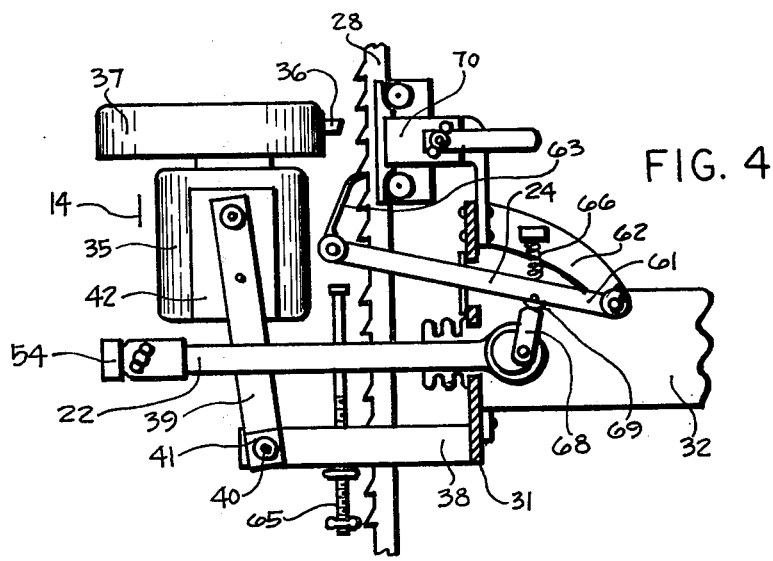
FIG. 4 is another section view looking as indicated along line 4—4 in FIG. 1., showing the right side of the grinder unit in the left hand position.

FIGS. 3 and 4 show the details now to be described. FIG. 3 is taken as looking, as indicated by arrows, along line 3—3 of FIG. 1 and FIG. 4 along line 4—4 of FIG. 1.

Each of the motor housings 13 and 14 of the grinder units 11 and 12 includes therein a motor 35, not shown separately, on the shaft of which is mounted grinding wheel 36. Each wheel has a removable protective cover 37 as shown in FIG. 4, also in FIG. 2. FIG. 3 shows the wheel, cover removed, in grinding contact with a tooth of blade 27, while FIG. 4 shows the wheel moved back away from the blade 28.

The edge of the grinding wheel 36 is dressed at an angle determined by the angle at when the face of the saw teeth are to be ground.

The motor housing is supported at the end of a square bar 38 extending out from plate 31. A stirrup yoke lever 39 straddles the bar and extends upward to support the housing of the motor 35 attached to its upper end. The span of the yoke is machined to fit closely over the end of bar 38, FIG. 2, and is pivoted on an accurately fitted pin 40. A boss 41, shown in FIGS.

2 and 4, through which pin 40 extends, is secured to the side of the yoke. A set screw is included in the boss to be run down on the pivot pin to hold it in place.

Figure 5:
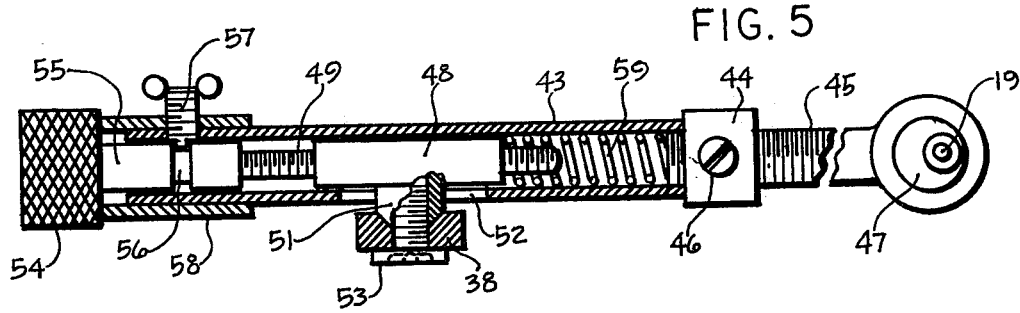
FIG. 5 is a sectional detail view of the grinder head travel adjustment link.

The motor housing 13–14 is provided with a flat plate surface 42 as an area in which attachment to the upper end of the yoke 39 is made. The angle of attachment is such that when the grinding wheel 36 is in its outward position, as shown in FIG. 4, the wheel is substantially horizontal and when the wheel is in grinding contact with a tooth of a blade, as shown in FIG. 3, the yoke is substantially verticle. This may be seen by comparing FIGS. 3 and 4. These relationships are not critical. Others may obtain. Each grinder is moved in and away by one of the pair of link assemblies 21 or 22. Detail description of a link assembly as shown in FIG. 5 is a sectional view from above based on link 21.

The link assembly comprises a tube 43 including a threaded nut portion 44 at its inner end. A threaded extension 45 therein provides for adjustment of the link to the length desired. It is retained in adjustment by screw 46 being set against extension 45. The link is actuated by jack shaft 19 through eccentric 47.

Enclosed in tube 43 is an internally threaded sleeve 48 fitted with screw 49 used to adjust the position of the sleeve longitudinally of the tube. The sleeve incorporates a boss 51 extending through slot 52 in the tube to contact yoke 38. It is held in position by screw 53 engaging boss 51 and adjusted to permit yoke 38 to pivot at that point as the link is reciprocated by eccentric 47.

High-grade band saws are now made with very hard tooth points. Grinding is the only satisfactory method of resharpening such points. It has been found that only a light touch or "kiss" of a point with a high speed grinding wheel will restore it to the best resharpened condition. This method of sharpening leaves no wire edge or burr on the off side of the tooth.

It has been found that an accurately operated machine set to just "kiss" the tooth will provide a sharp blade while removing a minimum amount of metal, lengthening the life of the blade and allow up to 10 resharpenings instead of only one or two when done by prior art machines.

Fine adjustment is required for obtaining this just right "kiss" of the grinder. This is provided by screw adjustment of sleeve 48 in tube 43 by screw 49 and by employing means to prevent loss motion in the link as it is actuated by the eccentric 47. Fine adjustment is made through knob 54 having a stem 55 which projects into tube 43. Adjustment screw 49 is secured to or made as a part of this stem. Loss of motion in the first instance is restrained by a groove 56 arranged to receive the tip of a thumb screw 57 fitted closely in the groove. The screw is carried by a collar 58 secured to the outer end of tube 43. The thumb screw is backed off for using knob 54 to turn screw 49 in sleeve 48 to adjust its position and the position of the grinder through yoke 38. After adjustment, the thumb screw 57 is reset against stem 55.

A spring 59 set against the inner end of sleeve 48 will guard against lost motion between screw 49 and the sleeve, and any that may occur between stem 55 and thumb screw 57.

It will be seen that by employing a link of the type just described for rocking the grinding unit toward and away from the tooth of a blade being ground, the travel can be adjusted and set to give just the desired "kiss" against the tooth. It will further be seen that such set will remain adjusted for a considerable period of time without further adjustment.

Figure 8:
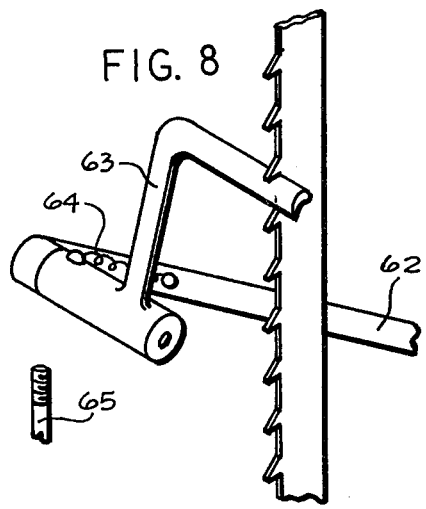
FIG. 8 is a detail view of the saw advancing pawl.

In a band saw sharpening operation after each tooth is ground the saw blade is advanced to the next tooth while the grinder is on its outward rock to permit such advance. The lever 61 which is shown as levers 23 and 24, FIG. 1, is pivoted at its inner end to a bracket 62. At its outer end a tooth engaging pawl 63, shown in more detail in FIG. 8, is pivoted to engage the saw teeth. A light spring 64, FIG. 8, lightly biases the pawl toward the saw. The lever is normally in a downward position as shown in FIG. 3. Its outer end rests on a stop screw 65 projected up through support bar 37. Lever 61 is urged downward by spring 66. The lever is moved upward to carry a tooth to grinding position when cam block 68 rotates into position against roller 69 on the lever. The block is accurately positioned to accomplish this while the grinder is swinging away and back toward the saw.

Band saws differ in the number of teeth to the inch. Therefore, the drop of the pawl to catch the next tooth must be varied. Adjusting the height of stop screw 65 provides for this.

To achieve the desired results of easy and accurate operation of the parts an improved saw clamp is made a part of this invention. For the best operation, the blade must be held accurately by its clamp and at the same time easily moved through as it is advanced tooth by tooth through the grinding operation.

Figure 6:
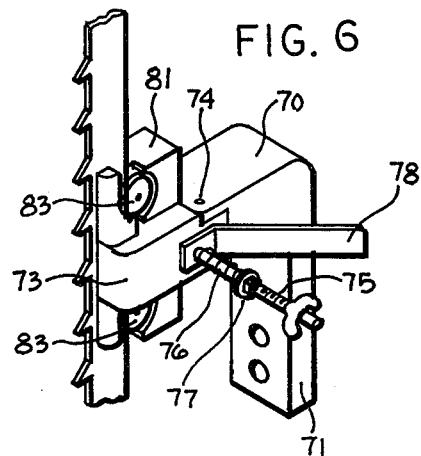
FIG. 6 is a detail view of the blade clamp showing the movable jaw side.
Figure 7:
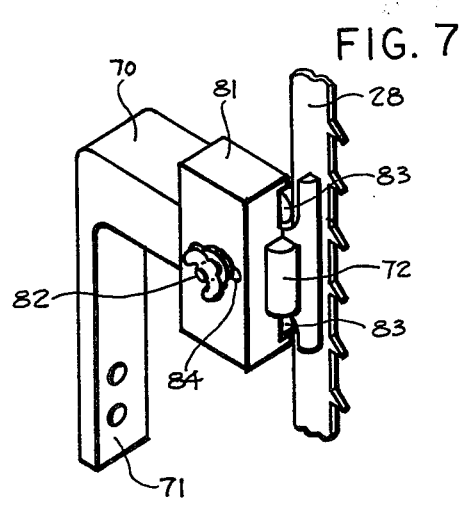
FIG. 7 is a detail view showing the fixed jaw side.
Figure 9:
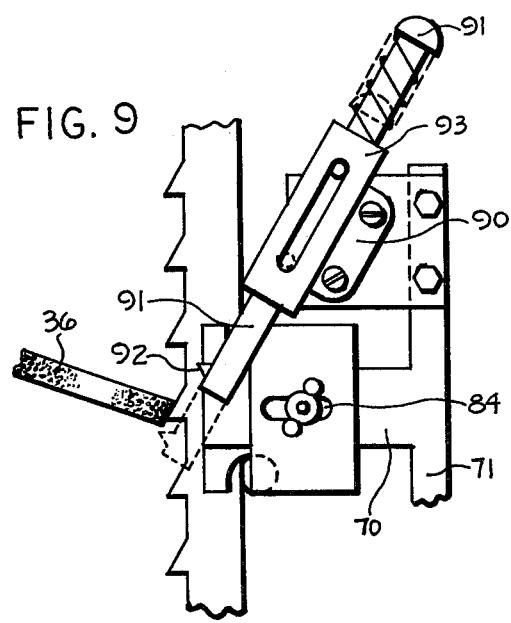
FIG. 9 is an elevation of a grinder wheel dressing attachment.

FIGS. 6 and 7 illustrate a saw clamp 70 which accomplishes the results outlined above. Clamp 70 is provided with a depending leg 71 for securing it to frame plate 31, FIGS. 1 and 2. The horizontal portion of the clamp carries two jaws, 72 and 73. Jaw 72 is fixed, jaw 73 is movable to open up and receive a blade. The movable jaw is hinged about pin 74. A threaded rod 75 extends through an opening, not shown, in the movable jaw 73 and is set in fixed jaw 72. A spring 76 behind a thumb nut 77 provides an adjustable pressure on the saw blade through jaw 73. A hand lever 78, set on the face of this jaw, will pivot it open against the spring when it is desired to release the blade. To increase the ease of advancement of the blade through the clamp by the action of pawl 63, a block 81 is clamped by screw 82 to fixed jaw 72 and includes guide rollers 83 set in contact with the rear edge of the saw blade. Block 81 is slotted to fit over the fixed jaw 72 and bring rollers 83 in line with the rear edge of the saw blade. Block 81 is clamped through slot 84 by means of which the guide rollers can be adjusted back and forth to accomodate blades of different widths.

In order to cause the grinding wheel to give just the right grinding contact or "kiss" to the point of the tooth, it is desirable to dress the wheel lightly, as needed, to keep its face in line with the face of the tooth.

It has been found that this can be most readily accomplished by mounting a dressing device 90 on an extension of the frame number 71 supporting the blade clamp 70. This device consists of a spring return plunger 91 carrying a dressing point 92 such as a diamond, disposed in a sleeve portion 93 of device 90. A segment of grinding wheel 36 is shown in grinding contact with a tooth of blade 28.

As already indicated, the angle of the edge of the grinding wheel is determined by the angle of the face of the tooth of the blade to be dressed. The sleeve is located at such position and angle that as the plunger 91 is depressed, tip 92 will strike and dress the edge of the wheel at the predetermined angle. When the plunger is released, tip 92 will be withdrawn to a noninterfering position while the grinding of the saw proceeds.

From the above description it is clear how the grinder units constructed in paired relationship are fitted together to comprise a unique band saw grinding machine. It is also clear that the arrangement for grinding two saw blade bands at one time amount to more than merely adding a duplicate unit to grind a second blade. The pairing makes it possible to place as shown in the drawings a compact actuating and control mechanism in the area between two grinder units. It also makes possible the grinding of two blades with the return portions of the blades outward of the mechanism assembly, avoiding conflicting occupancy by the various parts.

Having described the parts and their functions it will be readily apparent how the machine can be put into operation.

In operation it is commonly understood that the loop of a band saw blade can be reversed so that the downward cutting travel may appear either to the right or left leg of a loop suspended from above. To sharpen a given saw it will be mounted by draping the loop over the elevated idle wheel which would permit the normal cutting leg travel to be downward. It will be noted, that the saws thus arranged occupy much less floor space than if they were disposed horizontally.

Vice 70 would be opened by using lever 78. The saw would be slipped in, with the advancing pawl 63 held back, and the clamp 70 allowed to close. The pawl 63 biased by spring 64 would then assume a position in engagement with the saw. Then as feed motor 17 is started by closing switch 18 it will operate the jack shaft 19 and through the means already described cause the pawl to assume an up and down movement. On its upward movement it would engage a tooth of the saw and move it up to position to be sharpened.

Timed with this action eccentric 47 on shaft 19 moves link 21 or 22 outward to tilt the grinding wheel 35 away from the saw. As the action proceeds, the pawl is dropped down and the grinding wheels brought in to "kiss" the tooth which is in position to be ground. Just the right contact or "kiss" of the grinding wheel is obtained by starting the grinding sequence with the link 21 adjusted so that the grinder does not quite touch the saw tooth, then as the sequence of operation continues, the knob 54 is used to adjust the link 21 to bring the grinding wheel into the desired "kissing" contact with the tooth. Since as has been described, lost motion has been practically eliminated in the linkage for rocking the grinding wheel, fine adjustment of the grinding action is readily obtained. And due to accurate construction detail, the set amount of grind on each tooth will be maintained for the full length of the mounted saw blade after which the saw blade can be readily removed.

While this invention has been shown in a detailed form it will be understood by those skilled in the art that it may embodied in many other forms and modifications without departing from the spirit thereof and it is desired, therefore, that only such limitations shall be placed thereon as are imposed by the prior art or by the appended claims.

What we claim is:

1. A band saw blade grinder comprising means for supporting a band saw blade in a vertical position as its teeth are being ground, means for holding a vertically extending portion of the blade at a location where the blade teeth are ground means intermittently advancing the blade upwardly through the holding means to momentarily position each blade tooth for grinding at said holding means, a grinding unit including a motor and a motor driven grinding wheel mounted on the drive shaft of said motor, a support member, a fixed support structure, said motor being mounted on said support member and being supported thereby in a generally upright position, said support member extending downwardly from said motor and being pivotally secured at its lower end to said support structure to allow rocking movement of the assembly of said support member and said grinding unit about a horizontal pivot axis, a power source, an actuating link, means continuously drive connecting said power source to said actuating link to reciprocate said link, said link being pivotally secured to said support member at a point above said pivot axis such that as it reciprocates, it imparts rocking movement to said assembly to move said grinding wheel into and out of grinding contact with each saw blade tooth as it is advanced into grinding position at said holding means.

2. A band saw grinder according to claim 1 in which the actuating link includes a tubular body portion, a slot in the side of the body portion, a sleeve disposed in said body portion and having a boss protruding through the body slot means providing a pivotal connection between said boss to said support member to pivotally secure the boss to the support member, said sleeve being internally threaded, an adjusting screw threaded longitudinally through said sleeve and rotatably mounted in the outer end of the body portion, and means tending to prevent longitudinal lost motion between the sleeve and the body portion.

3. A band saw grinder according to claim 2 in which the means tending to prevent lost motion comprises a thumb screw arranged to be set against the head of the adjusting screw and a compression spring set to bear against one end of the sleeve tending to reduce lost motion.

4. A band saw blade grinder according to claim 1 wherein said actuating link includes first and second axially aligned parts, said support member being pivotally secured to one of said parts, said first part being internally threaded, and said second part being externally threaded and being adjustably threaded into said first part for selectively adjusting the effective length of said link between the pivotal connection of said support member to said link and the connection of said link to the means that drive connects said power source to said link, the adjustment of the effective length of said link providing for the adjustment of the angle through which said grinding unit is rocked by reciprocation of said link, and means for releasibly locking one of said parts in its adjusted position, 5. A band saw grinder according to claim 1 in which the means for holding the blade comprises a band saw blade clamp arranged to allow vertical travel of the blade through the same, said means for intermittently advancing the blade in each of the assemblies including a pawl having a rest position and disposed to engage a tooth and push it up to proper position to be ground, means for actuating said pawl to raise it from the rest position through a stroke to advance a tooth of a saw blade up to the grinding position and to allow the pawl to drop down, slide over the next tooth below to engage it for the next upward stroke, adjustable stop means for adjusting the rest position of the pawl to allow it to drop below the tooth to be advanced for saws for different spacing of teeth per inch.

6. A band saw blade grinder according to claim 1, wherein said holding means comprises a clamping unit having two jaws between which the blade is clamped for grinding, one of said jaws being held in a fixed position, the other jaw being hinged to the fixed jaw for opening to receive the blade, the fixed jaw having an adjustable block carrying two guide rollers positioned apart, one above the other, in line with the rear edge of the blade and arranged to provide an edge guide for the blade, and means associated with said block and rollers to adjust the position of the block and rollers to suitably guide blades of different blade widths.

7. A band saw blade grinder according to claim 1 wherein said band saw blade holding means comprises a blade clamping unit disposed to recieve said vertically extending portion of the blade, said blade supporting means being located above the grinding unit, said blade clamping unit and said grinding unit being located at a height where they are in the line of sight for an operator so that the saw blade teeth are clearly viewable by the operator at the location where they are being ground.

8. A band saw blade grinder comprising at least a pair of assemblies each having apparatus for supporting and grinding one of a plurality of band saw blades corresponding in number to the number of said assemblies, and drive means common to said assemblies, said supporting and grinding apparatus of each of said assemblies comprising means for supporting a band saw blade in vertical position such that the two flights of the band saw blade extend vertically, means for clamping a vertically extending portion of one of the band saw blade flights at a location where the band saw blade teeth are ground, means connected to and driven by said drive means for intermittently advancing said blade in a direction to move the blade upwardly through said clamping means and to momentarily position each blade tooth for grinding at said clamping means, a grinding unit including a grinding wheel drive motor and a grinding wheel mounted on the drive shaft of said grinding wheel drive motor to be driven thereby, means mounting said grinding unit with the drive shaft in an upright position, and means connected to and driven by said drive means for cyclically rocking said grinding unit back and forth to momentarily bring said grinding wheel into contact with each saw blade tooth as it is advanced into grinding position at said clamping means to sharpen same, the saw blade supporting means of said pair of assemblies being so disposed that the upwardly advancing flights of the supported band saw blades confronting each other, and the grinding units of said pair of assemblies being arranged to sharpen the teeth along the confronting flights of the two blades.

9. The band saw blade grinder defined in claim 8 wherein said support means of said two assemblies are disposed at a level above the grinding units of said assemblies.

10. The band saw blade grinder defined in claim 8 comprising means supporting said drive means in a region lying between the grinding units of said pair of assemblies.

* * * * *